United States Patent [19]

Sielfeld et al.

[11] Patent Number: 4,525,559

[45] Date of Patent: Jun. 25, 1985

[54] SUSPENSION POLYMERIZATION OF VINYL CHLORIDE WHEREIN SUSPENSION AGENT IS ADDED AFTER THE MONOMER CHARGE

[75] Inventors: Gilbert Sielfeld; Rudolf de Jong, both of Marl, Fed. Rep. of Germany

[73] Assignee: Chemische Werke Huels AG, Marl, Fed. Rep. of Germany

[21] Appl. No.: 409,795

[22] Filed: Aug. 20, 1982

[30] Foreign Application Priority Data

Aug. 20, 1981 [DE] Fed. Rep. of Germany ....... 3132890

[51] Int. Cl.³ ............................................. C08F 2/20
[52] U.S. Cl. ..................................... 526/200; 526/201
[58] Field of Search ....................... 526/199, 201, 200

[56] References Cited

U.S. PATENT DOCUMENTS

| | | | |
|---|---|---|---|
| 3,358,054 | 12/1967 | Dietrich et al. | 525/31 |
| 3,853,970 | 12/1974 | Dietrich | 264/331 |
| 4,011,388 | 3/1977 | Murphy | 526/201 |

FOREIGN PATENT DOCUMENTS

| | | | |
|---|---|---|---|
| 152346 | 11/1981 | Fed. Rep. of Germany | 526/201 |
| 41010 | 12/1971 | Japan | 526/201 |
| 1224693 | 3/1971 | United Kingdom | 526/201 |

Primary Examiner—Christopher A. Henderson
Attorney, Agent, or Firm—Millen & White

[57] ABSTRACT

Vinyl chloride polymers and copolymers are produced by suspension polymerization in the presence of a small amount of specific ethylene-vinyl acetate copolymers. The catalysts, the ethylene-vinyl acetate copolymer, and the monomer or monomer mixture are added to the polymerization charge before the suspension agent. The resultant polyvinyl chloride is especially suitable for lowering the viscosity of polyvinyl chloride plastisols.

6 Claims, No Drawings

SUSPENSION POLYMERIZATION OF VINYL CHLORIDE WHEREIN SUSPENSION AGENT IS ADDED AFTER THE MONOMER CHARGE

BACKGROUND OF THE INVENTION

The present invention concerns the production and utilization of a fine-grained vinyl chloride suspension polymer and its use as a viscosity-lowering medium in polyvinyl chloride plastisol processing.

Herein, polyvinyl chloride plastisols or polyvinyl chloride pastes are understood to mean, in general, dispersions of fine polyvinyl chloride powders in plasticizers which do not show excessive swelling. Suitable paste-forming types of polyvinyl chloride include emulsion polymers and, in particular, also microsuspension polymers. These polyvinyl chloride products are obtained after polymerization in latex form. They are processed generally by spray-drying into allogmerated secondary particles (plastisol grades). During plastisol processing, these agglomerates disintegrate predominantly into primary particles. The degree of such disintegration and the particle size distribution of the primary particles determine the flow properties of the paste.

Polyvinyl chloride pastes are utilized primarily as spread-coating pastes, dip-coating pastes, casting pastes, and molding pastes for a great variety of finished articles.

In general, pastes of low viscosities are desirable for the manufacture of finished articles low in plasticizer. It is known for this purpose to lower the paste viscosity by the addition of fine-grained suspension polyvinyl chloride products (so-called extender polyvinyl chloride). These are not paste-forming and are dissolved only at the gelling temperature.

According to German Pat. No. 1,645,668, it is possible to produce such suspension polymers for lowering the viscosity of dispersions of paste-forming polyvinyl chloride and plasticizers using methylhydroxypropylcelluloses having a viscosity of 50-500 m Pa s at 20° C. in a 2% by weight solution, as the only suspension stabilizer, and using monomer-soluble catalysts.

However, as demonstrated by Comparative Example C herein, polymers produced in this way contain a considerable proportion of relatively coarse grains having a particle size >100 μm. This leads to an undesirable sedimentation of the coarse proportion and therefore causes difficulties in processing. Furthermore, the coarse proportion results in an undesirably rough surface, especially when applying very thin coatings. Although a relatively high degree of viscosity lowering of the pastes is obtained by adding the resulting suspension polymers to plastisols, they fail to satisfy presently prevailing practical requirements.

As can be seen from the following Comparative Test E, very finely divided polyvinyl chloride polymers can be prepared by suspension polymerization in the presence of a suspension stabilizer and a tenside or emulsifier.

Because of its fineness and its minimum proportion of coarse particles >100 μm in size, a so-prepared polymer is suitable for thin coatings and does not tend toward sedimentation. However, due to its very high granular porosity, resulting from the addition of emulsifiers or tensides, the thus-manufactured product results in an inadequate lowering of paste viscosity.

SUMMARY OF THE INVENTION

Accordingly, it is an object of this invention to overcome or greatly ameliorate these disadvantages by providing a process for the production of finely divided PVC polymers as viscosity-lowering agents (extender PVC) for use in plastisol processing, as well as the polymers so produced.

Upon further study of the specification and appended claims, further objects and advantages of this invention will become apparent to those skilled in the art.

These objects have been attained by providing a process for the production of vinyl chloride polymers or copolymers by suspension polymerization in the presence of one or more suspension stabilizers, one or more monomer-soluble catalysts, and optionally pH buffering systems, comprising carrying out the polymerization in the presence of 0.4-8.0% by weight, based on the amount of monomer, of an ethylene-vinyl acetate copolymer having a vinyl acetate content of 38-55% by weight and a viscosity number of 95-210 ml/g, measured in toluene in a concentration of 0.005 g/cm$^3$ at 25° C.; with the proviso that the catalyst, the ethylene-vinyl acetate copolymer, and the monomer charge are added to the polymerization charge before addition of the suspension agent.

DETAILED DISCUSSION

According to this invention, the catalyst, the ethylene-vinyl acetate copolymer, and the monomer or monomer mixture are added to the suspension water, free of suspension stabilizer, under agitation, optionally in the presence of pH buffering systems. The order of addition of the ingredients prior to addition of stabilizer is not critical and follows conventional considerations. Subsequently, the mixture is preferably stirred for a period of time, for example 10-60 minutes.

Thereafter, the suspension stabilizer, suitably in the form of an aqueous solution, is added under excess pressure (e.g. 0.1-1.0 atm) in order to stabilize the polymerization charge. The suspension stabilizers can be added suitably in a 1-3% by weight aqueous solution with a feed rate of from 10% by weight per minute to 1% by weight per minute based on the total suspension stabilizer concentration to be utilized. The suspension stabilizer is added prior to beginning of polymerization. The polymerization is carried out in the absence of emulsifiers.

Suitable as ethylene-vinyl acetate copolymers to be used according to this invention are those consisting of 38-55% by weight, preferably 42-48% by weight, of vinyl acetate and having a viscosity number of 95-210 ml/g, preferably 110-160 ml/g, measured in toluene in a concentration of 0.005 g/cm$^3$ at 25° C. These are generally utilized in amounts of 0.4-8% by weight, preferably 0.6-3% by weight, based on the weight of the monomer or monomer mixture. The ethylene-vinyl acetate copolymers are not to contain emulsifiers since the process of this invention is to be conducted in the absence of emulsifiers.

Suitable ethylene-vinyl acetate copolymers are commercially available under the trade name "LEVAPREN". They can be fully conventionally prepared by radical polymerization in solution under a pressure of 100-400 bar and at a temperature of 30°-150° C. (German Pat. No. 1,126,613), whose disclosures are incorporated by reference herein.

Usable catalysts are the catalysts customarily used in vinyl chloride polymerization, such as diacyl peroxides, peroxydicarbonates, alkyl peresters, or azo compounds. For reasons of production safety, especially suitable are the initiators which are solid at room temperature and shelf-stable. Examples of suitable shelf-stable catalysts are lauroyl peroxide, bis(4-tert-butylcyclohexyl) peroxydicarbonate, dimyristyl peroxydicarbonate, dicetyl peroxydicarbonate, bis(2-methylbenzoyl peroxide. Catalysts are usually used in amounts of 0.01–0.5 wt % based on the weight of monomers.

Suitable suspension stabilizers are the types of compounds which are conventional and customarily employed, such as polyvinyl acetate, partially hydrolyzed polyvinyl actate (polyvinyl alcohol), cellulose ethers, such as those described, for example in the monograph by Kainer, "Polyvinylchlorid und Vinylchlorid-Mischpolymerisate" [Polyvinyl Chloride and Vinyl Chloride Copolymers], Springer Publishers, Berlin/Heidelberg/New York (1965), pages 16 et seq., which is incorporated by reference herein.

Preferred are the commercially available methylcelluloses with methoxy substitution degrees of 22–34% and viscosities of 10–5,000 m Pa s, preferably 10–100 m Pa s, measured in a 2% by weight aqueous solution (according to Brookfield at 20° C. and at 20 rpm), and/or methylhydroxypropylcelluloses having methyoxy substitution degrees of 20–32% and hydroxy-propoxy substitution degrees of 2–9%, and viscosities of 25–5,000, preferably 40–120 m Pa s, measured in a 2% aqueous solution (Ubbelohde capillary viscometer) at 20° C.

All of these are ordinarily employed in amounts of 0.05–1.5% by weight, preferably 0.1–1.0% by weight, based on the amount of monomer.

As other optional polymerization aids, it is possible to employ, if desired, pH buffering systems, such as ammonium salts, ammonia, or alkali carbonates, chain modifiers, e.g. aliphatic aldehydes, trichloroethylene, auxiliary agents to fight wall deposits, antioxidants, etc., all in conventional amounts, e.g., generally 0.01–2.0 wt % based on the amount of monomers.

The polymerization can be conducted at the customary temperatures of 30° to 80° C., preferably 45°–75° C.

The use of up to 30% by weight of monomers polymerizable with vinyl chloride is possible for the preparation of copolymers. Examples of the suitable comonomers are very well known and include vinyl esters, such as vinyl acetate, vinylidene halogenides, such as vinylidene chloride, acrylic acid and methacrylic acid alkyl esters of 1-18 carbon atoms in the alkyl group, such as the methyl, n-butyl, and lauryl esters, esters of maleic acid, such as diethyl, dipropyl maleate, and finally monoolefins, such as ethylene or propylene, etc.

The suspension polymers of this invention to be used together with paste-forming PVC grades can be processed according to the usual well-known methods. The customarily degasified, aqueous polyvinyl chloride suspension can first be dewatered in a centrifuge, the product optionally washed with pure water, and subsequently fed to a flash dryer. Optionally, a further drying step can be carried out in a drum dryer.

The extender polymers and copolymers produced in accordance with this invention can be employed as viscosity-lowering agents in accordance with the invention in mixtures of 95–45% by weight, preferably 95–50% by weight, of the polyvinyl chloride paste. Conventional emulsion or micro-suspension polymers are usually utilized as polyvinyl chloride grades which form a paste with plasticizer and other additives. The production of the polyvinyl chloride pastes is very well-known and described in detail in the above-mentioned monograph by Kainer on page 332.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A 40-liter polymerization reactor of stainless steel, equipped with impeller agitator and Pfaudler baffle, was charged with the following components:

15,500 parts of water, 10 parts of sodium carbonate. 3.4 parts of dicetylperoxydicarbonate, 6 parts of dilauroyl peroxide, and 100 parts of an ethylene-vinyl acetate copolymer having a vinyl acetate content of 45% by weight and a viscosity number of 138 ml/g, measured in toluene in a concentration of 0.005 g/cm$^3$ at 25° C. The reactor was sealed, purged with nitrogen, evacuated, and then charged with 11,200 parts of vinyl chloride and stirred for one hour at room temperature. Thereafter, 40 parts of a methylcellulose, dissolved in 3,000 parts of water and having a viscosity of 60 m Pa s, measured according to Brookfield (2% aqueous solution at 20° C. and 20 rpm) and a methoxy substitution degree of 28% was added at a feed rate of 0.66 part of methylcellulose per minute (50 parts of solution per minute). The reactor was heated to 60° C. and the mixture was polymerized to a final pressure of 5 bar. The product, after degasification, was separated from the largest portion of the water, rinsed with water, and dried at 50° C. in a fluidized bed dryer. As can be seen from Table 1, the thus-prepared product has a very fine grain and a pronounced viscosity-lowering effect when mixed with paste-forming polyvinyl chloride.

EXAMPLE 2

The process was conducted as described in Example 1, but using 50 parts of methylcellulose instead of 40 parts. As can be seen from Table 1, the thus-prepared product also has a very fine grain and a pronounced viscosity-lowering effect in a blend with paste-forming polyvinyl chloride.

EXAMPLE 3

The procedure of Example 1 was followed, but using, instead of 40 parts of methylcellulose, 60 parts and, instead of 100 parts of ethylene-vinyl acetate copolymer, 200 parts. As can be derived from Table 1, the resultant product has a very fine grain and possesses a pronounced viscosity-lowering effect when mixed with paste-forming polyvinyl chloride.

EXAMPLE 4

The process of Example 3 was repeated, but using, instead of 200 parts of ethylene-vinyl acetate copolymer, 100 parts of an ethylene-vinyl acetate copolymer having a vinyl acetate content of 45% by weight and a viscosity number of 118 ml/g, measured in toluene in a concentration of 0.005 g/cm$^3$ at 25° C. As can be seen from Table 1, the thus-prepared product has a very fine grain and a pronounced viscosity-lowering action in a blend with paste-forming polyvinyl chloride.

COMPARATIVE EXAMPLE A

A 40-liter polymerization reactor of stainless steel, equipped with impeller agitator and Pfaudler baffle, was charged with the following components:

17,000 parts of water, 10 parts of sodium carbonate, 3.4 parts of dicetylperoxydicarbonate, 6 parts of dilauroyl peroxide, and 60 parts of the methylcellulose used in Example 1, but dissolved in 1,500 parts of water. The reactor was then sealed, purged with nitrogen, evacuated, charged with 11,200 parts of vinyl chloride, and stirred for one hour at room temperature. Then the reactor was heated to 60° C. and the polymerization was conducted to a final pressure of 5 bar. The product, after degasification, was separated from the largest part of the water, rinsed with pure water, and dried at 50° C. in a fluidized bed dryer. As can be seen from Table 1, the resultant product has an extremely coarse grain and shows deficient viscosity-lowering action in a blend with paste-forming polyvinyl chloride.

COMPARATIVE EXAMPLE B

The procedure of Comparative Example A was followed, but using instead of 60 parts of methylcellulose, 40 parts. As can be derived from Table 1, the thus-prepared product also exhibits too large a proportion of particles of a size >100 μm, and a deficient viscosity-lowering effect in a blend with paste-forming polyvinyl chloride.

EXAMPLE 5

The procedure of Example 2 was followed, but using, instead of the methylcellulose, 60 parts of a methylhydroxypropylcellulose with a methoxy content of 22.1% by weight, a hydroxy-propoxyl substitution degree of 8.1% by weight, and a viscosity of 100 m Pa·s (measured with an Ubbelohde capillary viscometer on a 2% by weight solution at 20° C.). As can be seen from Table 1, the thus-prepared product has a very fine grain and an excellent viscosity-lowering effect in a mixture with paste-forming polyvinyl chloride.

EXAMPLE 6

The procedure of Example 5 was repeated, but using 60 parts of methylhydroxypropylcellulose instead of 50 parts. As can be derived from Table 1, the resultant product also has a very fine grain and a pronounced viscosity-lowering action in a blend with paste-forming polyvinyl chloride.

EXAMPLE 7

The process was carried out as described in Example 5, but with the use of 200 parts of ethylene-vinyl acetate copolymer instead of 100 parts. As can be derived from Table 1, the thus-prepared product has a very fine grain and a pronounced viscosity-lowering effect when blended with paste-forming polyvinyl chloride.

COMPARATIVE EXAMPLE C

According to German Pat. No. 1,645,668

A 40-liter polymerization reactor of stainless steel, equipped with impeller agitator and Pfaudler baffle, was charged with the following components:

17,000 parts of water, 10 parts of sodium carbonate, 30 parts of a methylhydroxypropylcellulose (dissolved in 1,500 parts of water and having a methoxy substitution degree of 22.1% by weight, a hydroxypropyl substitution degree of 8.1% by weight, and a viscosity of 100 m Pa·s (measured with an Ubbelohde capillary viscometer on 2% aqueous solutions at 20° C.)), 3.4 parts of dicetylperoxydicarbonate, and 6 parts of dilauroyl peroxide. The reactor was sealed, purged with nitrogen, evacuated, then charged with 11,200 parts of vinyl chloride. Polymerization was conducted for one hour at room temperature. The reactor was then heated to 60° C. and polymerized to a final pressure of 5 bar. The product was separated, after degasification, from the largest portion of the water, purged with pure water, and dried in a fluidized bed dryer at 50° C. As can be seen from Table 1, the thus-produced material has an undesirably high coarse proportion of >100 μm.

COMPARATIVE EXAMPLE D

The procedure of Example C was repeated, but using 60 parts of methylhydroxypropylcellulose instead of 30 parts. As can be derived from Table 1, the resultant product still has too high a proportion of particles of a size >100 μm and shows a deficient viscosity-lowering effect when blended with paste-forming polyvinyl chloride.

COMPARATIVE EXAMPLE E

The process of Comparative Example C is repeated, but using 40 parts of methylhydroxypropylcellulose instead of 30 parts and additionally 2.5 parts of sodium lauryl sulfate. As can be seen from Table 1, the thus-prepared product has a fine grain, but an inadequate viscosity-lowering effect when blended with paste-forming polyvinyl chloride.

TABLE 1

| | Particle Size Distribution in % by Weight Retained on Sieve, in Mesh | | | | Bulk[1] Density [g/l] | Plasticizer Absorption[2] g DOP 100 g PVC | Paste Viscosity[3] in d Pa s at Shear Rate | | | | Tear[4] Strength [N/mm²] | Elongation at Rupture[4] [%] |
|---|---|---|---|---|---|---|---|---|---|---|---|---|
| | 40 μm | 63 μm | 100 μm | 160 μm | | | 0.3s⁻¹ | 1s⁻¹ | 10s⁻¹ | 100s⁻¹ | | |
| Example 1 | 63 | 0.2 | — | — | 671 | 6.0 | 96 | 82 | 87 | 99 | 13.7 | 133 |
| Example 2 | 71 | 0.1 | — | — | 706 | 6.1 | 88 | 88 | 98 | 110 | 18.3 | 208 |
| Example 3 | 59 | 1.0 | — | — | 723 | 4.8 | 98 | 87 | 92 | 106 | 13.2 | 117 |
| Example 4 | 77 | 0.8 | 0.01 | — | 673 | 6.1 | 104 | 93 | 103 | 114 | — | — |
| Comp. Ex. A | 79 | 56.0 | 3.1 | 10 | 601 | 13.1 | 162 | 152 | 161 | 167 | 11.6 | 120 |
| Comp. Ex. B | 89 | 70 | 50 | 3.9 | 634 | 16.2 | — | 271 | 341 | — | 13.1 | 137 |
| Example 5 | 60 | 1.0 | 0.01 | — | 698 | 5.8 | 97 | 93 | 104 | 119 | 13.0 | 131 |
| Example 6 | 61 | 0.4 | — | — | 660 | 6.3 | 107 | 96 | 107 | 120 | 14.4 | 123 |
| Example 7 | 50 | 0.4 | — | — | 736 | 5.0 | 91 | 87 | 96 | 111 | 14.4 | 115 |
| Comp. Ex. C | 81 | 33 | 9.2 | 0.2 | 640 | 10.3 | 138 | 131 | 146 | 147 | 11.8 | 120 |

TABLE 1-continued

| | Particle Size Distribution in % by Weight Retained on Sieve, in Mesh | | | | Bulk[1] Density [g/l] | Plasticizer Absorption[2] g DOP / 100 g PVC | Paste Viscosity[3] in d Pa s at Shear Rate | | | | Tear[4] Strength [N/mm²] | Elongation at Rupture[4] [%] |
|---|---|---|---|---|---|---|---|---|---|---|---|---|
| | 40 μm | 63 μm | 100 μm | 160 μm | | | $0.3s^{-1}$ | $1s^{-1}$ | $10s^{-1}$ | $100s^{-1}$ | | |
| Comp. Ex. D | 84 | 58 | 5.1 | 0.2 | 574 | 13.8 | 208 | 208 | 223 | — | 11.9 | 112 |
| Comp. Ex. E | 63 | 2.6 | 0.2 | | 523 | 14.0 | 687 | 637 | 569 | 494 | 16.2 | 156 |

[1]According to DIN 53 468
[2]According to DIN 53 417/1 (centrifuging method)
[3]Paste Recipe:
50 parts by weight of emulsion polyvinyl chloride
50 parts by weight of polyvinyl chloride prepared according to this invention
38 parts by weight of di-2-ethylhexylphthalate
2 parts by weight of Ba/Cd/Zn stabilizer.
Paste Viscosity was measured in a "Rheomat" (Contraves) after a storage period of 24 hours.
[4]Gelling Capacity of paste (after breathing) was measured on 1 mm press-molded plates (gelling time being 1 minute at 170° C.) according to DIN 53 455 (tensile strength test). The tear strength values and the elongation at rupture values are averages from 7 measured values.

The preceding examples can be repeated with similar success by substituting the generically or specifically described reactants and/or operation conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing a vinyl chloride polymer or copolymer by suspension polymerization in the presence of a suspension stabilizer, and a monomer-soluble catalyst, comprising carrying out the polymerization in the presence of 0.4–8.0% by weight, based on the amount of monomer, of an ethylene-vinyl acetate copolymer having a vinyl acetate content of 42–48% by weight and a viscosity number of 95–210 ml/g, measured in toluene in a concentration of 0.005 g/cm³ at 25° C.; the improvement wherein the catalyst, the ethylene-vinyl acetate copolymer, and the monomer charges are added to the polymerization charge before addition of the suspension agent.

2. A process of claim 1 conducted in the presence of a pH buffer system.

3. A process of claim 1 wherein the ethylene/vinyl acetate copolymer has a viscosity number of 110 ml/g to 160 ml/g, measured in toluene in a concentration of 0.005 g/cm³ at 25° C.

4. A process of claim 1 wherein the suspension stabilizer comprises 0.05–1.5% by weight, based on the amount of monomer or monomer mixture, of a methylcellulose having a methoxy substitution degree of 22–34% and a viscosity of 10–5,000 m Pa s, measured in a 2% by weight aqueous solution and measured according to the Brookfield method at 20° C. and 20 rpm, or a methylhydroxypropylcellulose with a methoxy substitution degree of 20–32% and a hydroxy-propoxy substitution degree of 2–9% and a viscosity of 25–5,000 m Pa s, measured in a 2% by weight aqueous solution using a Ubbelohde capillary viscometer at 20° C.

5. A process of claim 4 wherein the amount of cellulose derivative is 0.1–1.0% by weight, the viscosity of the methylcellulose is 10–100 m Pa s and the viscosity of the methylhydroxypropylcellulose derivative is 40–120 m Pa s.

6. A process of claim 1 wherein the polymerization is conducted in the presence of 0.6–3% by weight of ethylene/vinyl acetate copolymer, based on the weight of monomer or monomer mixture.

* * * * *